United States Patent
Perryman et al.

(10) Patent No.: US 10,256,592 B1
(45) Date of Patent: Apr. 9, 2019

(54) DEVICE, SYSTEM AND METHOD WITH CASCADED BURST MODE LASER AMPLIFIED PUMPING OSCILLATOR SIGNAL

(71) Applicant: LOCKHEED MARTIN CORPORATION, Bethesda, MD (US)

(72) Inventors: Gary P. Perryman, Nathrop, CO (US); James R. Wood, Grapevine, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 15/498,757

(22) Filed: Apr. 27, 2017

(51) Int. Cl.
H01S 3/30 (2006.01)
H01S 3/10 (2006.01)
H01S 3/00 (2006.01)
H01S 3/09 (2006.01)

(52) U.S. Cl.
CPC .............. H01S 3/0057 (2013.01); H01S 3/09 (2013.01)

(58) Field of Classification Search
CPC ............ H01S 3/06716; H01S 3/10015; H01S 3/06754; H01S 3/09; H01S 3/0057
USPC ............................................. 372/6, 21, 25, 5
See application file for complete search history.

(56) References Cited

U.S. PATENT DOCUMENTS

| | | | | |
|---|---|---|---|---|
| 4,574,249 A * | 3/1986 | Williams | ................ | H03F 1/083 330/59 |
| 6,160,480 A * | 12/2000 | Su-yueh | ............. | A61B 5/02438 340/573.1 |
| 7,872,794 B1 * | 1/2011 | Minelly | .............. | H01S 3/06758 359/341.31 |
| 2011/0122895 A1 * | 5/2011 | Savage-Leuchs | ........................... | H01S 3/06758 372/10 |
| 2011/0182306 A1 | 7/2011 | Hosseini et al. | | |
| 2012/0300290 A1 * | 11/2012 | Kakui | ................ | B23K 26/0608 359/341.1 |
| 2013/0044768 A1 * | 2/2013 | Ter-Mikirtychev | .......................... | H01S 3/06758 372/5 |
| 2014/0050234 A1 * | 2/2014 | Ter-Mikirtychev | ......................... | H01S 3/10007 372/6 |
| 2014/0300951 A1 | 10/2014 | Messerly et al. | | |
| 2016/0197451 A1 * | 7/2016 | Kraemer | ............. | H01S 3/10015 372/25 |

* cited by examiner

*Primary Examiner* — Tuan Nguyen
(74) *Attorney, Agent, or Firm* — Terry M. Sanks, Esq.; Beusse Wolter Sanks & Maire, PLLC (57) ABSTRACT

A device comprising a low-power oscillator having an oscillator output, the oscillator when triggered produces X number of oscillator pulses in series at a high repetition rate from the oscillator output, where X is an integer. The device comprises a plurality of X series coupled amplifiers having a common optical path. The plurality of X amplifiers amplify a power parameter of the X number of oscillator pulses. A first amplifier of the plurality of X amplifiers is coupled to the oscillator output. The plurality of amplifiers are triggered in sequence in accordance with the high repetition rate of the oscillator so that an output from a last amplifier of the plurality of X amplifiers is a burst of X amplified pumping oscillator (APO) pulses with high-peak power and high-average power over the burst of APO pulses. A system and a method are also provided.

18 Claims, 5 Drawing Sheets

402
Producing, by a low-power oscillator having an oscillator output, X number of oscillator pulses in series at a high repetition rate, where X is an integer 404
Triggering in sequence in accordance with the high repetition rate of the oscillator, a plurality of X series coupled amplifiers 406
Amplifying, by the plurality of X series coupled amplifiers having a first common optical path, a power parameter of the X number of oscillator pulses, a first amplifier of the plurality of amplifiers coupled to the oscillator output and an output, from a last amplifier of the plurality of X series coupled amplifiers, is a burst of X APO pulses with high-peak power and high-average power over the burst of X APO pulses 408
Triggering a burst (chirped) pulse laser amplifier stage having X laser amplifiers having a second common optical path, by the burst of X APO pulses 410
Amplifying, by the burst (chirped) pulse laser amplifier stage, an optical signal to produce a burst pulse laser signal which has high peak power and high average power

FIG. 4

DEVICE, SYSTEM AND METHOD WITH CASCADED BURST MODE LASER AMPLIFIED PUMPING OSCILLATOR SIGNAL

BACKGROUND

Embodiments relate to a device, a system and a method for generating a cascaded burst mode laser amplified pumping oscillator signal.

Traditional laser sources may be configured to have either high-average power or high-peak power. However, the laser configurations fall short from providing both characteristics of high-average power and high-peak power. For some applications, laser sources which provide a high-peak power with a high-average power burst are needed. The high-peak power is generally defined by multiple joules per pulse, where the pulse is <=10 nanoseconds. High-average power is approximately >=1000 Watts (1000 Joules/sec.).

In order to achieve high-peak and high-average power, traditionally the power supplies for the laser source would be scaled for the thermal loads of the high-average power. The short pulse widths might be limited to a few hundred picoseconds and repetition rates in the range of 50 to 100 Hertz (Hz). This solution is very expensive. However, for some applications which require shorter pulse widths, higher repetition rates are required in the range of kilohertz (kHz) or higher.

Current laser source designs have unsolvable thermal problems which drive optical instability and poor or worse operation of the laser amplifiers causing mechanical problems. The current laser source design may provide for a higher repetition rate and highest energy per pulse to pump other materials ((i.e., infrared (IR) and Titanium Sapphire)) to generate increased peak powers, but only at the repetition rate of the pump laser. Typical repetition rates would be 10 to 20 Hz pumps and multi-joule energy at a few hundred picoseconds to a few nanoseconds. This pumping laser would energize an additional stage of oscillation with higher optical bandwidth and may utilize chirped pulse amplification (CPA) yield with temporally shorter pulses.

SUMMARY

Embodiments relate to a device, a system and a method for generating a cascaded burst mode laser amplified pumping oscillator signal. An embodiment includes a device comprising a low-power oscillator having an oscillator output, the oscillator when triggered produces X number of oscillator pulses in series at a high repetition rate from the oscillator output, where X is an integer. The device comprises a plurality of X series coupled amplifiers having a common optical path. The plurality of X amplifiers amplify a power parameter of the X number of oscillator pulses. A first amplifier of the plurality of X amplifiers is coupled to the oscillator output. The plurality of amplifiers are triggered in sequence in accordance with the high repetition rate of the oscillator so that an output from a last amplifier of the plurality of X amplifiers is a burst of X amplified pumping oscillator (APO) pulses with high-peak power and high-average power over the burst of APO pulses.

An aspect of the embodiments includes a system comprising a low-power oscillator having an oscillator output, the oscillator when triggered produces X number of oscillator pulses in series at a high repetition rate from the oscillator output, where X is an integer. The system comprises a plurality of X series coupled amplifiers having a first common optical path and which amplify a power parameter of the X number of pulses. A first amplifier of the plurality of amplifiers is coupled to the oscillator output. The plurality of amplifiers are triggered in sequence in accordance with the high repetition rate of the oscillator so that an output from a last amplifier of the plurality of X series coupled amplifiers is a burst of X amplified pumping oscillator (APO) pulses with high-peak power and high-average power over the burst of X APO pulses. A burst pulse laser amplifier stage has X laser amplifiers having a second common optical path and being triggered by the burst of X APO pulses to produce a burst pulse laser signal which has high-peak power and high-average power.

Another aspect of the embodiments includes a method comprising: producing, by a low-power oscillator having an oscillator output, X number of oscillator pulses in series at a high repetition rate, where X is an integer; triggering in sequence in accordance with the high repetition rate of the oscillator, a plurality of X series coupled amplifiers; amplifying, by the plurality of X series coupled amplifiers having a first common optical path, a power parameter of the X number of oscillator pulses, a first amplifier of the plurality of amplifiers coupled to the oscillator output and an output from a last amplifier of the plurality of X series coupled amplifiers is a burst of X amplified pumping oscillator (APO) pulses with high-peak power and high-average power over the burst of X APO pulses; triggering a burst pulse laser amplifier stage having X laser amplifiers having a second common optical path, by the burst of X APO pulses; and amplifying, by the triggered burst pulse laser amplifier stage, an optical signal to produce a burst pulse laser signal which has high-peak power and high-average power.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1A:
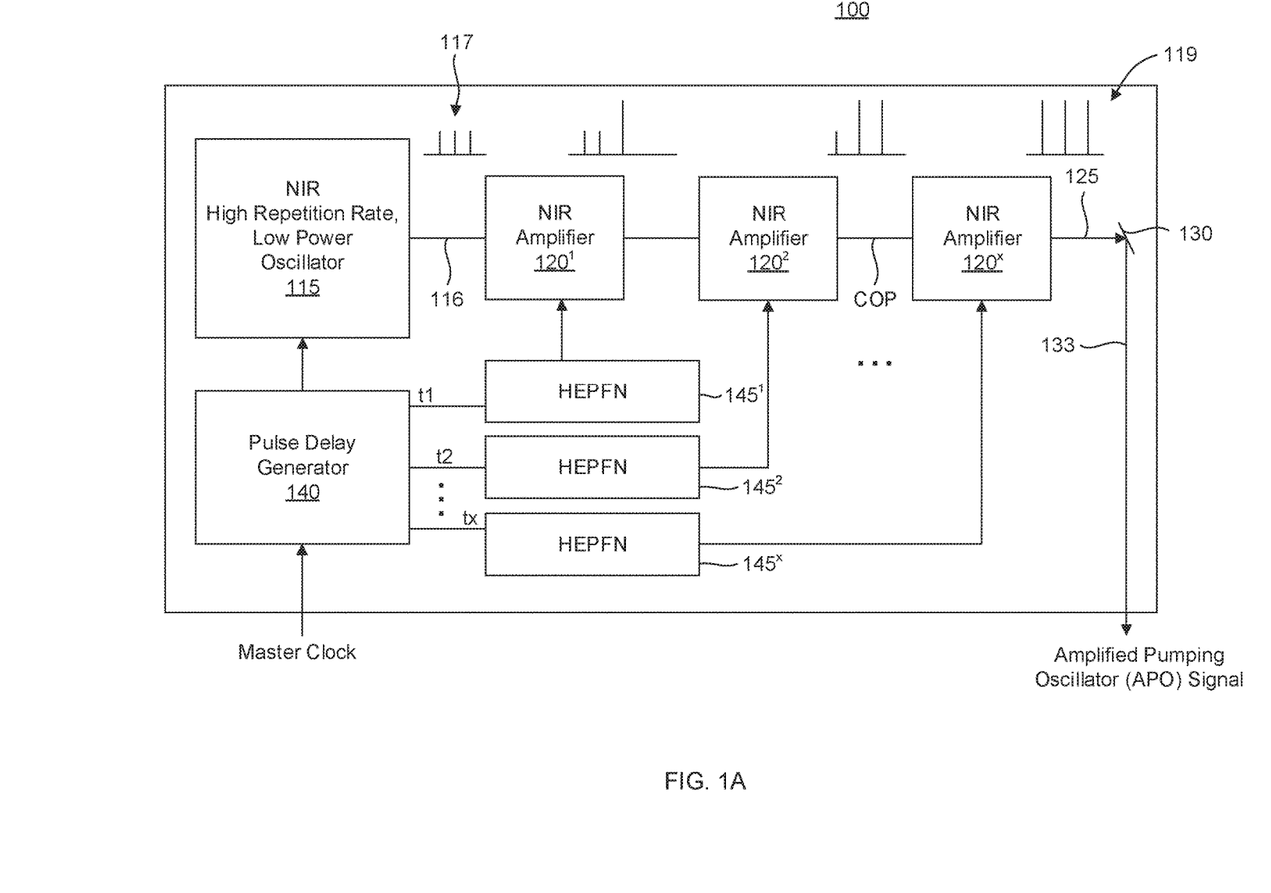
FIG. 1A illustrates a block diagram of a device for generating a cascaded burst mode laser amplified pumping oscillator (APO) signal.

FIG. 1A illustrates a block diagram of a device 100 for generating a cascaded burst mode laser amplified pumping oscillator (APO) signal. The device 100 may comprise a low-power oscillator 115 having an oscillator output 116, the oscillator 115 may be triggered to produce X number of oscillator pulses 117 in series at a high repetition rate from the oscillator output 116 wherein X is an integer greater than zero (0) and X is a function of the number of laser amplifiers as will be discussed in more detail in relation to FIG. 2.

The device 100 may comprise a plurality of X series coupled amplifiers $120^1, 120^2, \ldots, 120^X$ having a common optical path COP. The plurality of X series coupled amplifiers $120^1, 120^2, \ldots, 120^X$ amplify a power parameter of the X number of oscillator pulses 117. A first amplifier $120^1$ of the plurality of amplifiers $120^1, 120^2, \ldots, 120^X$ may be coupled to the oscillator output 116. The plurality of amplifiers $120^1, 120^2, \ldots, 120^X$ may be triggered in sequence in accordance with the high repetition rate of the oscillator so that an output 125 from a last amplifier $120^X$ of the plurality of X series coupled amplifiers $120^1, 120^2, \ldots, 120^X$ is a burst of X amplified pumping oscillator (APO) pulses 119 with high-peak power and high-average power over the burst of APO pulses 119. The burst of X APO pulses 119 as will be described in more detail. Each pulse in the burst of X APO pulses 119 may have a first amplitude and a first pulse width. Each pulse of the X number of oscillator pulses 117 may have a second amplitude and a second pulse width. The first amplitude is different from the second amplitude. In some embodiments, the first pulse width substantially equals the second pulse width. Moreover, the spacing between adjacent pulses of the burst of X APO pulses 119 may be the same as the spacing between adjacent pulses of the X number of oscillator pulses 117. The burst of X APO pulses 119 will sometimes be referred to herein as the burst of X pumping pulses.

The power parameter of each pulse of the X number of pulses 116 is approximately 1-10 milli-joules (mJ) per pulse, for example. Each amplifier amplifies the power parameter by a factor of approximately 10-50, for example. In some embodiments, the factor may be in the range of 1-10. Each amplifier of the plurality of amplifiers $120^1, 120^2, \ldots, 120^X$ may be a near infrared (NIR) amplifier; the oscillator output 116 of the oscillator 115 may have a laser pulse in the NIR wavelength. The plurality of amplifiers $120^1, 120^2, \ldots, 120^X$ may be laser pumped amplifiers.

By way of non-limiting example, the NIR wavelength may be 1.06 um for both the oscillator 115 and the amplifier. Nonetheless, other NIR wavelengths may be used. The oscillator 115 may be a laser pulsed oscillator having a high repetitious oscillator with pulse repetition frequency (PRF) rate of 300 μsec wherein each pulse may have a pulse width of approximately 300 picoseconds (ps).

The device 100 may further comprise a pulse delay generator 140 to trigger the oscillator 115 to produce the X number of oscillator pulses 117 in series and to trigger an $i^{th}$ amplifier for only an $i^{th}$ pulse of the X number of pulses 116. By way of non-limiting example, the first amplifier (i=1) will amplify the first pulse. The second amplifier (i=2) will amplify the second pulse. The X amplifier (i=X) will amplify the X pulse.

In some embodiments, the pulse delay generator 140 may be configured to trigger the oscillator 116 to produce the X number of oscillator pulses 117 in series and to trigger a respective one amplifier of the plurality of X series coupled amplifiers $120^1, 120^2, \ldots, 120^X$ for only a respective one pulse of the X number of pulses. In other words, the first amplifier $120^1$ may amplify the last pulse of the X number of oscillator pulses 117, while the last amplifier $120^X$ may amplify the first pulse of the X number of oscillator pulses 117.

The pulse delay generator 140 may be coupled to a plurality of high energy pulse forming networks (HEPFNs) $145^1, 145^2, \ldots, 145^X$. A corresponding one high energy pulse forming network (HEPFN) is coupled to a respective one amplifier to trigger and/or bias the respective one amplifier. Each HEPFN receives a timing control signal t1, t2, ..., tX from the pulse delay generator 140 to control the timing of the triggering of the related amplifier. The pulse delay generator 140 may include a processing unit to perform the timing control. The respective one amplifier $120^1, 120^2, \ldots, 120^X$ amplifies the power parameter of only one pulse, wherein the respective one amplifier is gated for operation by the corresponding one HEPFN $145^1, 145^2, \ldots, 145^X$ so that a gain of the amplifier has an operational gain length of time which is longer than the pulse width of said only one oscillator pulse. The plurality of amplifier $120^1, 120^2, \ldots, 120^X$ are controlled to have a cascaded gating time so that each amplifier amplifies only one non-amplified pulse of the X number of oscillator pulses 117. The HEPFN may be used to drive optical flash lamps or arrays of the laser diodes to provide the optical pumping energy needed for each NIR amplifier of the plurality of amplifier $120^1, 120^2, \ldots, 120^X$. By way of non-limiting example, the pump pulse repetition rate is set by the cascade architecture of pumped Nd:YAG (neodymium-doped:yttrium aluminum garnet) rods of the cascaded amplifiers of the amplifier chain.

The plurality of amplifier $120^1, 120^2, \ldots, 120^X$ may sometimes be referred to as an amplifier chain. The amplifier chain may be energized or triggered at a nominal relative low repetition rate (i.e., 10 Hz), but the resulting burst of X APO pulses 119 would be at a considerably higher repetition rate. In other words, the amplifier chain delivers bursts in the kHz range, at high-average power and high-peak power, but these bursts only occur at much lower rates such as in the range of 10-30 Hz, by way of non-limiting example.

By way of non-limiting example, as shown in FIG. 1A, the first amplifier $120^1$ may receive the X number of oscillator pulses 117 propagated along the common optical path COP, but only amplifies one pulse (e.g., the first pulse) of the X number of oscillator pulses 117. The second amplifier $120^2$ may receive the X number of oscillator pulses 117 propagated along the common optical path COP, but only amplifies one pulse (e.g., the second pulse) of the X number of oscillator pulses 117. The X number of oscillator pulses 117 received at the second amplifier includes a first amplified pulse followed by X−1 pulses having the original pulse amplitude (or unamplified). The first pulse was previously amplified by the first amplifier. The X amplifier $120^X$ receives the X number of oscillator pulses 117 propagated along the common optical path COP, but only amplifies one pulse (e.g., the $X^{th}$ pulse) of the X number of oscillator pulses 117. The X number of oscillator pulses 117 received at the X amplifier includes X−1 amplified pulses followed by one (last) non-amplified oscillator pulse or Xth oscillator pulse.

The output 125 from a last amplifier of the plurality of X series coupled amplifiers $120^1$, $120^2$, ..., $120^X$ may be sent to an optical or light directing component 130. The directing component 130 may be a mirror or reflector. The directing component 130 directs the output 125 to path 133. The output 125 is a cascaded burst mode laser amplified pumping oscillator (APO) signal.

Figure 1B:
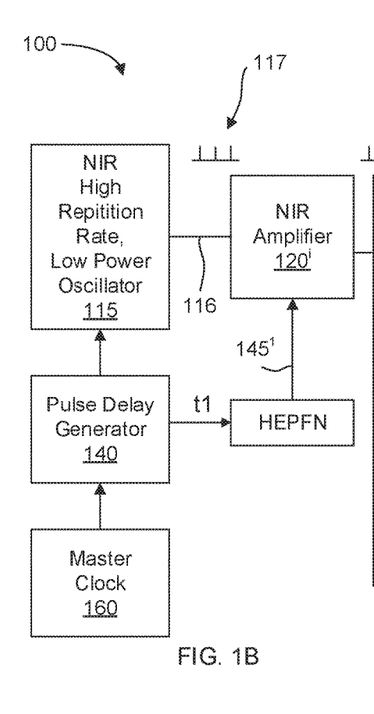
FIG. 1B illustrates a partial block diagram of the device of FIG. 1A.
Figure 1C:
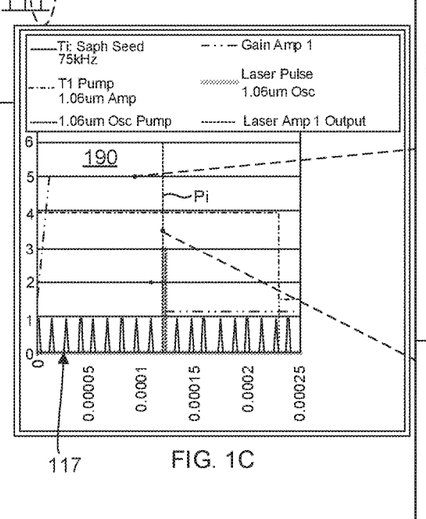
FIG. 1C illustrates an amplifier pulse gain profile for an $i^{th}$ amplifier.

FIG. 1B illustrates a partial block diagram of the device 100 of FIG. 1A which produces pulse Pi in oscillator pulses 117. FIG. 1C illustrates an amplifier pulse gain profile 190 to amplify pulse Pi by an $i^{th}$ amplifier. In FIG. 1C, the pulse Pi from amplifier $120^i$ being amplified by the gain profile shown. The amplifier $120^i$ is gated, energized or triggered for operation by the corresponding one HEPFN $145^1$, $145^2$, ..., $145^X$ so that a gain of the amplifier has an operational gain length of time which is longer than the pulse width of only one pulse.

Figure 1D:
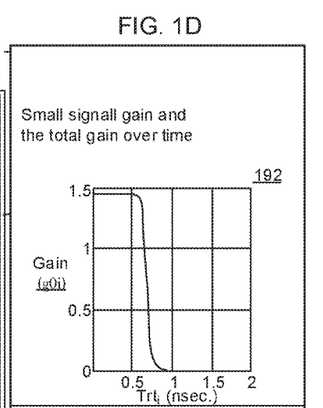
FIG. 1D illustrates a graphical representation of a gain curve over time profile for an $i^{th}$ amplifier in FIG. 1B according to the amplifier pulse gain profile of FIG. 1C.

FIG. 1D illustrates a graphical representation 192 of a gain (g0i) curve over time ($Trt_i$) profile for an $i^{th}$ amplifier $120^i$ in FIG. 1B according to the amplifier pulse gain profile 190 of FIG. 1C wherein the gain (g0i) is the energy gain ratio of energy contained in the population inversion of the gain media to the incoherent energy in the media not at the population inversion. The graphical representation 192 of a gain (g0i) curve over time ($Trt_i$) profile for an $i^{th}$ amplifier $120^i$ depicts a single stage detailed operation of a high power pulse. The high-average power curve profile depicted at the burst of X APO pulses 119 (FIG. 1A).

Figure 1E:
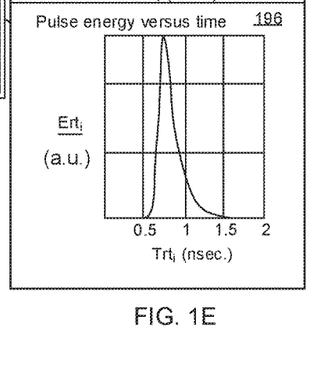
FIG. 1E illustrates a graphical representation of a pulse energy curve over time profile for the $i^{th}$ amplifier in FIG. 1B according to the amplifier pulse gain profile of FIG. 1C.

FIG. 1E illustrates a graphical representation 196 of a pulse energy curve over time profile for the $i^{th}$ amplifier $120^i$ in FIG. 1B according to the amplifier pulse gain profile 190 of FIG. 1C. In FIG. 1E, the graphical representation 196 of a pulse energy curve over time profile for the $i^{th}$ amplifier $120^i$ has a high-peak power profile. The pulse energy curve is represented in arbitrary units (au) for illustrative purposes.

FIG. 1B illustrates device 100 receiving a master clock signal from a master clock 160 which may be a Titanium-Sapphire seed clock of 75 kHz. The master clock 160 may be used to trigger the pulse delay generator 140. The pulse delay generator 140 may simultaneously trigger the oscillator 115 and at least one of the HEPFNs $145^1$, $145^2$, ..., $145^X$. The pulse delay generator 140 may trigger all HEPFNs or just one at a time. The pulse delay generator 140 may provide cascaded timing control signals to the HEPFNs $145^1$, $145^2$, ..., $145^X$. In some embodiments, the pulse delay generator 140 may provide different timing control signals to the HEPFN $145^1$, $145^2$, ..., $145^X$ simultaneously or the timing control signals may be based on the order of gating the amplifiers.

The total pulse energy ($Ert_i$) is equal to the photon density $\phi_i$ (times) the volume (times) energy per photon (EL) where the volume is defined as (A·c·dt) and A is area, c is speed of light in the media, dt is the incremental time step toward the accumulative build-up time and i is an integer corresponding to an $i^{th}$ amplifier $120^i$. The accumulative build-up time $(Trt_i) = i \cdot dt \cdot 10^9$. The graphical representation 190 corresponds to a small signal gain and the total gain over time. The graphical representation 196 corresponds to the total pulse energy ($Ert_i$) profile. The amplifier $120^i$ is gated, energized or triggered so that the corresponding pulse Pi for which the amplifier is timed to amplify from the X number oscillator pulses 117 corresponding in time to the high-peak point of the curve for the total pulse energy ($Ert_i$) in FIG. 1E.

The small signal gain is that energy gain taken in by the laser media from the non-coherent optical pump and that is able to be released as coherent energy as an output pulse. The signal gain is higher as the non-coherent light is first delivered over time, and then exponentially gets smaller as the population inversion becomes near a maximum condition for the laser gain media. The gain is high until the gain media has reached a population inversion and is ready to be dumped from the laser media. The model shown has the gain at a maximum in graphical representation 192 and then dropping in time. When the light leaves the gain media as a coherent pulse, the gain is depleted, until more pumping light is presented into the media. The second trace on the model of the graphical representation 196 is the energy released from the laser gain media as a function of time.

The model of the graphical representation 190 shows the operation of the laser after optical cavity pumping and population inversion. This energy is then Q-switched to release the energy gained over the non-coherent optical pumping time in a ~10 ns coherent laser pulse which is then sent through the amplifiers $120^1$, $120^2$, ..., $120^X$ and on to deliver the energy as a pump to X laser amplifiers $370^1$, ..., $370^X$ (FIG. 3) wherein the laser amplifiers $370^1$, ..., $370^X$ may be wideband coherent amplifiers.

By way of non-limiting example, X number of NIR pulses with a 300 picosecond (ps) pulse width from the oscillator 115 is sent through the HEPFN biased amplifier stages and enters a fully HEPFN "pumped" stage, where the population is fully inverted. The amplifier $120^i$ then becomes the amplifier for the ith selected 300 ps NIR pulse. The 300 ps NIR pulses deliver the NIR energy in output 125 to path 133 as a pump to a burst pulse amplification stage 250.

Figure 2:
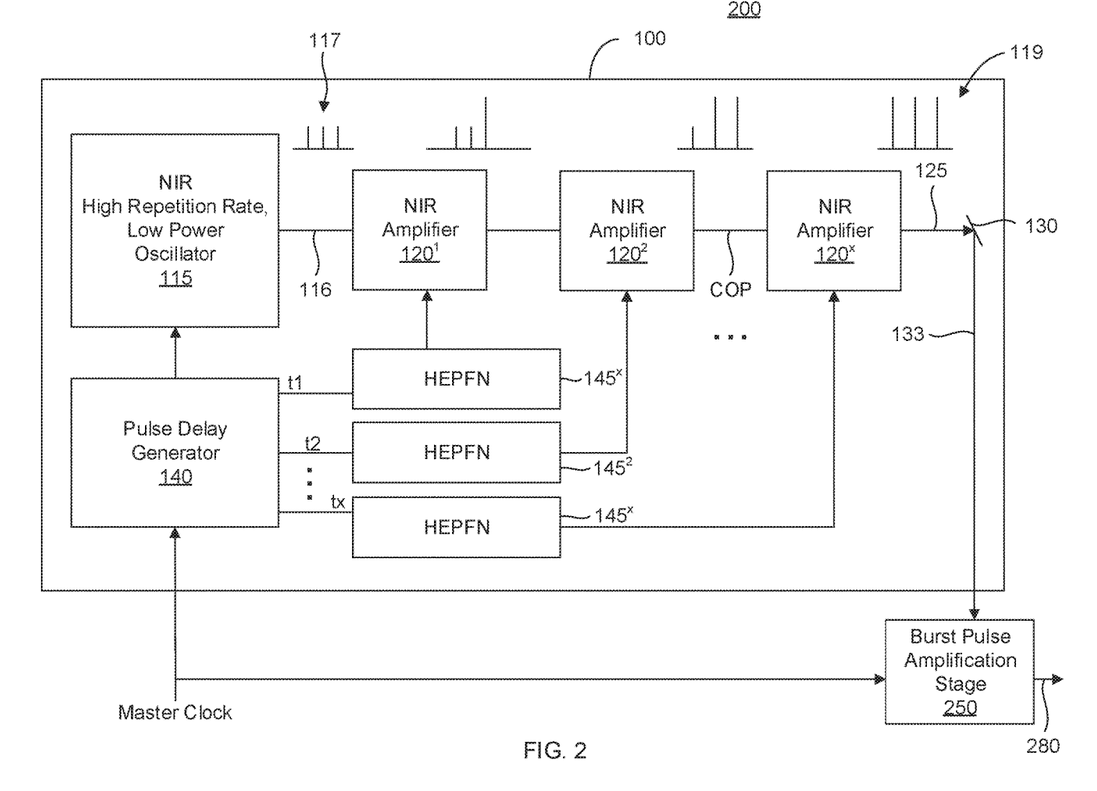
FIG. 2 illustrates a block diagram of a burst laser pump system with a device for cascaded burst mode laser pumping of a burst pulse amplification stage.

FIG. 2 illustrates a block diagram of a burst laser pump system 200 with the device 100 for cascaded burst mode laser pumping of a burst pulse amplification stage 250. For the sake of brevity, the device 100 is the same as those in FIG. 1A and will not be described in relation to FIG. 2. The output 125 from a last amplifier of the plurality of X series coupled amplifiers $120^1$, $120^2$, ..., $120^X$ may be sent to an optical or light directing component 130. The directing component 130 may be a mirror or reflector. The directing component 130 directs the output 125 to path 133 which in turn is sent to a burst pulse amplification stage 250 which produces a burst laser output 280. Both the burst pulse amplification stage 250 and the pulse delay generator 140 of the device 100 receive the master clock signal of the burst laser pump system 200.

The device 100 may produce a cascaded burst mode laser APO signal output for the control or pumping of the pulse amplification stage 250 to cause a high-peak power and high-average laser pulse output such as for directed energy (DE) applications. In some embodiments, the burst pulse amplification stage 250 is a chirped pulse laser amplifier stage to produce a chirped pulse laser signal which has high-peak power and high-average power.

Figure 3:
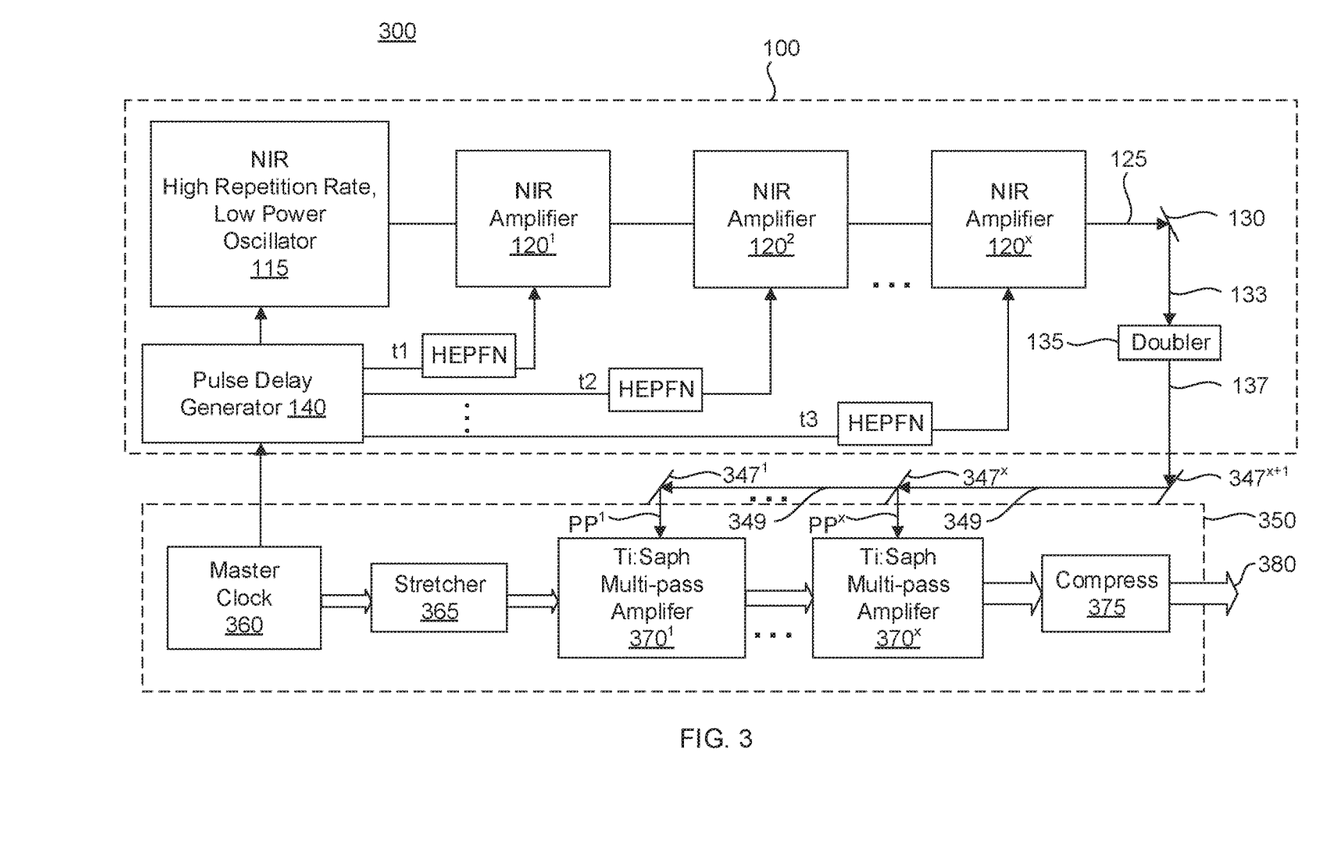
FIG. 3 illustrates a block diagram of a burst laser pump system with a device for cascaded burst mode laser pumping of a chirped pulse amplification stage.

FIG. 3 illustrates a block diagram of a burst laser pump system 300 with a device 100 for cascaded burst mode laser pumping of a chirped pulse amplification stage 350. In this embodiment, the master clock 360 is shown as part of the chirped pulse amplification stage 350. Nonetheless, the master clock 360 may be separate.

By way of non-limiting example, the chirped pulse amplification stage 350 comprises X laser amplifiers $370^1, \ldots, 370^X$ having a second common optical path $COP_2$ and being triggered by the burst of X APO pulses 119 (FIG. 1A). Each of the X laser amplifiers $370^1, \ldots, 370^X$ may comprise a Titanium Sapphire (Ti:Saph) multi-pass amplifier. The X laser amplifiers $370^1, \ldots, 370^X$ are coupled in series.

In an embodiment, the output from the master clock 360 is sent (propagated) to a stretcher 365 to stretch the optical seed clock (master clock signal). The output of the stretcher 365 is propagated to the first laser amplifier of the X laser amplifiers $370^1, \ldots, 370^X$. Each laser amplifier $370^1, \ldots, 370^X$ receives the signal from the immediately preceding laser amplifier. Each laser amplifier $370^1, \ldots, 370^X$ also receives a corresponding amplified pulse in the cascaded burst mode laser APO signal. For example, laser amplifier $370^1$ receives only one of the amplified pumping pulses $PP^1$ in the burst of X APO pulses 119. Laser amplifier $370^X$ receives only one amplified pumping pulses $PP^X$ in the burst of X APO pulses 119. In some embodiments, $PP^1$ may be from amplifier $120^1$. The pumping pulse $PP^X$ may be from amplifier $120^X$. There is a one-to-one correspondence between the X APO pulses 119 and the X laser amplifiers $370^1, \ldots, 370^X$.

By way of non-limiting example, the device 100 further includes a doubler 135 configured to double the frequency of the cascaded burst mode laser APO signal (i.e., output 125). The output 137 from doubler 135 includes the cascaded burst mode laser APO signal and may be sent to the chirped pulse amplification stage 350 via a plurality of intermediary optical or light directing components $347^1, \ldots, 347^X$, $347^{X+1}$ and optical path, denoted by lines 349. Light directing component $347^{X+1}$ receives the cascaded burst mode laser APO signal from the doubler 135 and directs the cascaded burst mode laser APO signal to directing component $347^X$ so that the signal portion with pumping pulse $PP^X$ may be directed to and received by laser amplifier $370^X$. The doubler 135 may be a frequency doubler including a nonlinear crystal to double the frequency of the input signal.

The directing component $347^X$ in turn directs the cascaded burst mode laser APO signal to the next directing component. The cascaded burst mode laser APO signal is directed though the directing components $347^1, \ldots, 347^X$. Directing component $347^1$ directs the signal with $PP^1$ to the laser amplifier $370^1$. The output of the last laser amplifier $370^X$ may be propagated to a pulse compressor 375. The compressor 375 may compress or shorten the pulse width of the laser pulses at the output of the last laser amplifier $370^X$. The pulse compressor 375 may include a refractive or diffractive compressor element.

In some embodiments, the systems 200 or 300 are configured to have high-peak power in the range of 100 kilowatts (kW) to terawatts (TW).

The higher optical bandwidth is provided by the seed laser pulses from a low power mode locked wideband laser (i.e., master clock 360). The higher optical bandwidth path and elements extend from the master clock 360 to stretcher 365, X (multi-pass) laser amplifiers $370^1, \ldots, 370^X$, and pulse compressor 375.

Figure 4:
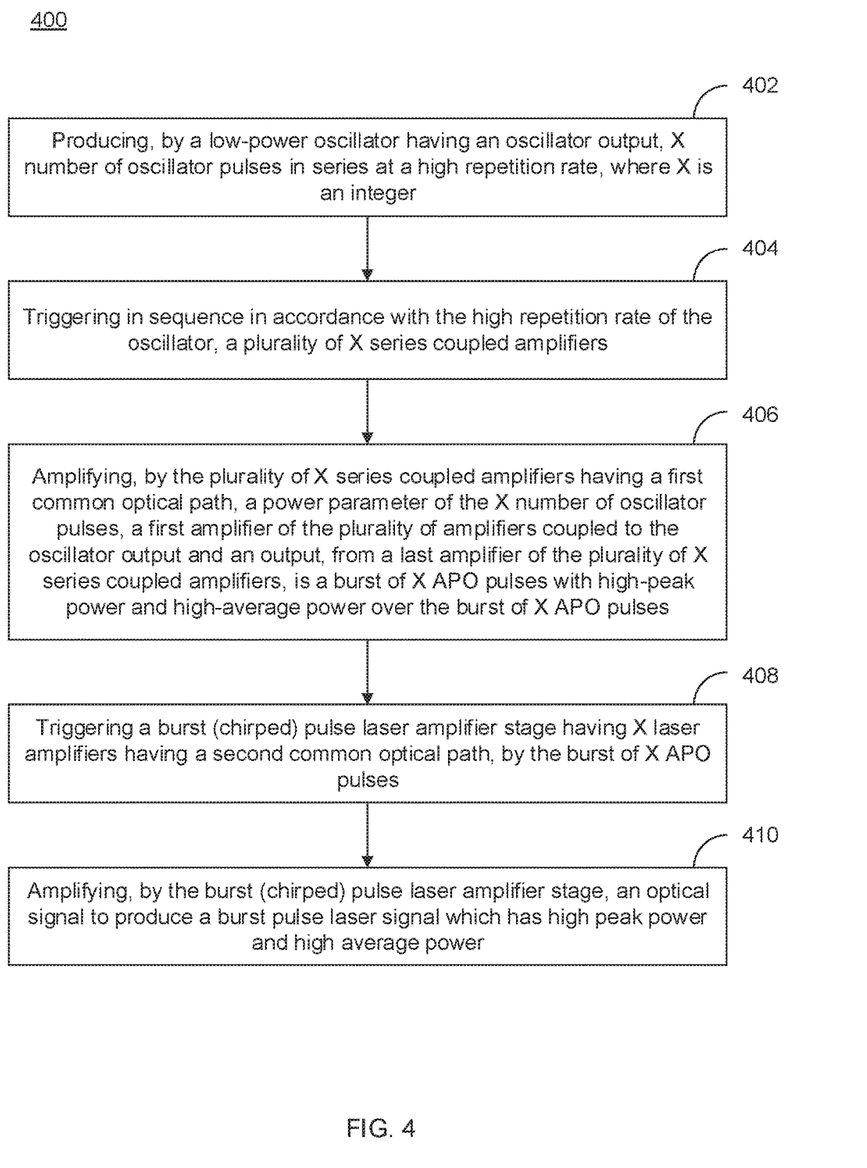
FIG. 4 is a method for cascading burst mode laser pumping for a laser pump system.

FIG. 4 is a method 400 for cascading burst mode laser pumping for a laser pump system 200 or 300. The method blocks may be performed in the order shown or a different order. One or more blocks may be performed contemporaneously. One or more blocks may be omitted or added. The method will be described in relation to FIGS. 1A 2, and/or 3.

The method 400 comprising, at block 402, producing, by a low-power oscillator 115 having an oscillator output 116, X number of oscillator pulses 117 in series at a high repetition rate, where X is an integer. The method 400, at block 404, may comprise triggering in sequence in accordance with the high repetition rate of the oscillator 115, a plurality of X series coupled amplifiers $120^1, 120^2, \ldots, 120^X$. The method 400, at block 406, may comprise amplifying, by the plurality of X series coupled amplifiers $120^1, 120^2, \ldots, 120^X$ having a first common optical path $COP_1$ a power parameter of the X number of oscillator pulses 117. A first amplifier of the plurality of amplifiers $120^1, 120^2, \ldots, 120^X$ is coupled to the oscillator output 116 and an output 125 from a last amplifier of the plurality of X series coupled amplifiers $120^1, 120^2, \ldots, 120^X$ is a burst of X APO pulses 119 with high-peak power and high-average power over the burst of X APO pulses 119.

At block 408, the method 400 may comprise triggering a burst (chirped) pulse laser amplifier stage 250 or 350 comprising X laser amplifiers having a second common optical path, by the burst of X APO pulses 119. At block 410, the method may comprise amplifying, by the triggered pulse laser amplifier stage, an optical signal to produce a burst pulse laser signal which has high-peak power and high-average power.

The block 402 of the method 400 may further comprise: triggering, by a pulse delay generator 140, the oscillator 115 to produce the X number of oscillator pulses 117 in series; and triggering, by the pulse delay generator 140, an $i^{th}$ amplifier for only an $i^{th}$ pulse of the X number of oscillator pulses 117.

The block 402 of the method 400 may further comprise: triggering, by a pulse delay generator 140, the oscillator 115 to produce the X number of oscillator pulses 117 in series; and triggering, by the pulse delay generator 140, a respective one amplifier of the plurality of X series coupled amplifiers $120^1, 120^2, \ldots, 120^X$ for only a respective one pulse of the X number of oscillator pulses 117.

For example, if the system 300 has X=10 laser gain amplifiers $370^1, \ldots, 370^X$, the device 100 would include X=10 amplifiers $120^1, \ldots, 120^X$, increasing the average energy and power by a factor of 10. For a 10 mJ at 300 ps pulse width oscillator (i.e., oscillator 115), if the amplifiers $120^1, \ldots, 120^X$ amplify by a gain factor of 30×, the 10 mJ x 30=0.3 J, wherein 0.3 J/300 ps=1 gigawatt (GW). This will generate a field strength in free space of ~600 kV/m (kiloVolts/meter). If the output from the laser gain amplifiers $370^1, \ldots, 370^X$ at 300 ps is compressed by the pulse compressor 375 by a factor of 300 to 1 ps, yields power of 0.3 TW, which in turn may provide field strengths of ~6 MV/m during the burst pulse laser output, at output 380. By way of non-limiting example, the gain may be a factor of 3 wherein the number of amplifiers $120^1, \ldots, 120^X$ may be 10. When high-peak power laser systems (in the range of 100 kW to TW) are utilized, the desired effects may also require kW or higher average powers. Average powers greater than a kilowatt may be considered a high-average power.

The embodiments described herein allow a combination of high-peak and high-average power over longer time periods than previously available. Additionally, the embodiments described herein may yield a burst of optical pulses at much higher repetition rates than previously available. By using cascaded amplifiers triggered in a stepped or cascaded fashion, each pumping pulse of the resulting burst is primarily amplified by only one of the sequence of amplifiers in the amplifier chain. The total amplifier chain (i.e., amplifiers $120^1, \ldots, 120^X$) would be energized at a nominal relative low repetition rate (i.e., 10 Hz), but the resulting burst of X APO pulses would be at a considerably higher repetition rate, up to the rate of the oscillator 115. The bursts of X APO pulses at the rates of the NIR oscillator 115 amplified through the amplifier chain become a high-average power, high-peak power burst of NIR energy pulses which could be used to pump a chirped pulse amplifier (CPA). The embodiments herein may achieve very high-peak power and very high-average power over the duration of the burst from laser output 280 of FIG. 3.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions, and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A device comprising:
an oscillator having an oscillator output, the oscillator, when triggered, to produce X number of oscillator pulses in series at a repetition rate from the oscillator output, where X is an integer;
X series coupled amplifiers having a common optical path and amplify a power parameter of the X number of oscillator pulses, a first amplifier of the X series coupled amplifiers coupled to the oscillator output, the X series coupled amplifiers are triggered in sequence in accordance with the repetition rate of the oscillator so that an output from a last amplifier of the X series coupled amplifiers is a burst of X amplified pumping oscillator (APO) pulses; and
a pulse delay generator coupled to a plurality of pulse forming networks, a corresponding different one pulse forming network (PFN) is coupled to a respective $i^{th}$ amplifier of the X series coupled amplifiers to trigger the respective $i^{th}$ amplifier and wherein each PFN receives a timing control signal from the pulse delay generator wherein i being a number from 1 to X.

2. The device of claim 1, wherein the power parameter of each pulse of the X number of oscillator pulses being in a range of 1-10 milli-joules per pulse and each amplifier of the X series coupled amplifiers amplifies the power parameter by a factor in a range of 10-50.

3. The device of claim 1, wherein the pulse delay generator configured to trigger the oscillator to produce the X number of oscillator pulses in series and to trigger the respective $i^{th}$ amplifier of the X series coupled amplifiers for only an $i^{th}$ pulse of the X number of oscillator pulses.

4. The device of claim 1, wherein the respective $i^{th}$ amplifier of the X series coupled amplifiers amplifies the power parameter of only an $i^{th}$ oscillator pulse of the X number of oscillator pulses, wherein the respective $i^{th}$ amplifier is gated for operation by the corresponding one PFN so that a gain of the respective $i^{th}$ amplifier has an operational gain length of time which is longer than a pulse width associated with only the $i^{th}$ oscillator pulse.

5. The device of claim 1, wherein each amplifier of the X series coupled amplifiers is a near infrared (NIR) amplifier and the oscillator output has an NIR wavelength.

6. The device of claim 1, wherein the first amplifier of the X series coupled amplifiers being directly coupled to the oscillator output.

7. A system comprising:
an oscillator having an oscillator output, the oscillator, when triggered, to produce X number of oscillator pulses in series at a repetition rate from the oscillator output, where X is an integer;
X series coupled amplifiers having a first common optical path and amplify a power parameter of the X number of oscillator pulses, a first amplifier of the X series coupled amplifiers coupled to the oscillator output, the X series coupled amplifiers are triggered in sequence in accordance with the repetition rate of the oscillator so that an output from a last amplifier of the X series coupled amplifiers is a burst of X amplified pumping oscillator (APO) pulses;

a burst pulse laser amplifier stage having X laser amplifiers having a second common optical path and being triggered by the burst of X APO pulses to produce a burst pulse laser signal; and a pulse delay generator coupled to a plurality of pulse forming networks, a corresponding different one pulse forming network (PFN) is coupled to a respective $i^{th}$ amplifier of the X series coupled amplifiers to trigger the respective $i^{th}$ amplifier and wherein each PFN receives a timing control signal from the pulse delay generator wherein i being a number from 1 to X.

8. The system of claim 7, wherein the power parameter of each pulse of the X number of oscillator pulses being in a range of 1-10 milli-joules per pulse, each amplifier amplifies the power parameter by a factor in a range of 10-50, and a power of the burst pulse laser signal is in a range of 100 kilowatts (kW) to terawatts (TW).

9. The system of claim 7, wherein the pulse delay generator configured to trigger the oscillator to produce the X number of oscillator pulses in series and to trigger the respective $i^{th}$ amplifier of the X series coupled amplifiers for only an $i^{th}$ pulse of the X number of oscillator pulses.

10. The system of claim 7, wherein the respective $i^{th}$ amplifier amplifies the power parameter of only an $i^{th}$ oscillator pulse of the X number of oscillator pulses, wherein the respective $i^{th}$ amplifier is gated for operation by the corresponding different one PFN so that a gain of the respective $i^{th}$ amplifier has an operational gain length of time which is longer than a pulse width associated with only the $i^{th}$ oscillator pulse.

11. The system of claim 7, further comprising a master oscillator clock configured to generate a master clock signal, wherein the master clock signal being received by the pulse delay generator and the burst pulse laser amplifier stage.

12. The system of claim 7, wherein each amplifier of the X series coupled amplifiers is a near infrared (NIR) amplifier; the oscillator output of the oscillator has an NIR wavelength.

13. The system of claim 7, wherein the first amplifier of the X series coupled amplifiers being directly coupled to the oscillator output.

14. A method comprising:

producing, by an oscillator having an oscillator output, X number of oscillator pulses in series at a repetition rate, where X is an integer;

triggering in sequence in accordance with the repetition rate of the oscillator, X series coupled amplifiers, wherein a pulse delay generator being coupled to a plurality of pulse forming networks, a corresponding different one pulse forming network (PFN) is coupled to a respective $i^{th}$ amplifier of the X series coupled amplifiers to trigger the respective $i^{th}$ amplifier and wherein each PFN receives a timing control signal from the pulse delay generator wherein i being a number from 1 to X;

amplifying, by the X series coupled amplifiers having a first common optical path, a power parameter of the X number of oscillator pulses, a first amplifier of the X series coupled amplifiers coupled to the oscillator output and an output, from a last amplifier of the X series coupled amplifiers, is a burst of X amplified pumping oscillator (APO) pulses;

triggering a burst pulse laser amplifier stage having X laser amplifiers having a second common optical path, by the burst of X APO pulses; and amplifying, by the triggered burst pulse laser amplifier stage, an optical signal to produce a burst pulse laser signal.

15. The method of claim 14, wherein the power parameter of each pulse of the X number of oscillator pulses is in a range of 1-10 milli-joules per pulse, each amplifier of the X series coupled amplifiers amplifies the power parameter by a factor in a range of 10-50, and a power of the burst pulse laser signal is in a range of 100 kilowatts (kW) to terawatts (TW).

16. The method of claim 14, further comprising:

triggering, by the pulse delay generator, the oscillator to produce the X number of oscillator pulses in series; and triggering, by the pulse delay generator, the respective $i^{th}$ amplifier of the X series coupled amplifiers for only an $i^{th}$ pulse of the X number of pulses.

17. The method of claim 16, wherein the respective $i^{th}$ amplifier is gated for operation so that a gain of the respective $i^{th}$ amplifier has an operational gain length of time which is longer than a pulse width associated with only the $i^{th}$ oscillator pulse.

18. The method of claim 14, wherein the first amplifier of the X series coupled amplifiers being directly coupled to the oscillator output.

* * * * *